United States Patent
Leitheiser (10) Patent No.: US 9,923,990 B2
(45) Date of Patent: Mar. 20, 2018

(54) USER INFORMATION WIDGETS AND METHODS FOR UPDATING AND RETRIEVING USER INFORMATION

(75) Inventor: Gregory Leitheiser, San Antonio, TX (US)

(73) Assignee: International Business Machines Corporation, Armonk, NY (US)

(*) Notice: Subject to any disclaimer, the term of this patent is extended or adjusted under 35 U.S.C. 154(b) by 679 days.

(21) Appl. No.: 12/403,398

(22) Filed: Mar. 13, 2009

(65) Prior Publication Data
US 2010/0235754 A1 Sep. 16, 2010

(51) Int. Cl.
| H04L 29/08 | (2006.01) |
| G06F 17/30 | (2006.01) |
| G06Q 30/02 | (2012.01) |
| H04L 29/06 | (2006.01) |

(52) U.S. Cl.
CPC ...... *H04L 67/306* (2013.01); *G06F 17/30867* (2013.01); *G06Q 30/0269* (2013.01); *H04L 63/0815* (2013.01); *H04L 63/0884* (2013.01)

(58) Field of Classification Search
CPC ............... G06Q 30/02; G06Q 30/0269; G06F 17/30867; G06F 17/30702; H04L 67/306; H04L 63/0815; H04L 63/0884
USPC .................................. 715/741–746, 962, 777
See application file for complete search history.

(56) References Cited

U.S. PATENT DOCUMENTS

| 5,502,806 | A | * | 3/1996 | Mahoney et al. ............ 715/839 |
| 6,300,948 | B1 | * | 10/2001 | Geller et al. .................. 715/866 |
| 7,243,308 | B2 | * | 7/2007 | Lamb et al. ................... 715/744 |
| 8,060,823 | B2 | * | 11/2011 | Griffith et al. ................ 715/715 |
| 8,583,915 | B1 | * | 11/2013 | Huang ................ H04L 63/0869 713/155 |
| 2003/0028427 | A1 | * | 2/2003 | Dutta ..................... G06Q 30/02 705/14.1 |
| 2009/0164902 | A1 | * | 6/2009 | Cohen .................. G10H 1/0025 715/716 |
| 2009/0287559 | A1 | * | 11/2009 | Chen et al. ................. 705/14.23 |
| 2010/0049585 | A1 | * | 2/2010 | McIntyre .......... G06F 17/30702 705/51 |

FOREIGN PATENT DOCUMENTS

WO WO 2008130932 A1 * 10/2008 ............. G06Q 90/00

* cited by examiner

*Primary Examiner* — Andrew Tank
(74) *Attorney, Agent, or Firm* — Law Office of Jim Boice (57) ABSTRACT

User information is provided to web applications by embedding a widget in a web page served to a user's client from a web application server. The widget is a software component that is configured to retrieve user information from a user information web server repository in response to a request by a web application for user information. The widget is also configured to request user permission to retrieve user information from the repository and to request user verification of retrieved information prior to providing the retrieved information to the requesting web application. The user information widget is configured to authenticate a user prior to retrieving user information from the repository. The user information widget authenticates a user by requesting credentials from the user and verifying that the received credentials are valid for the user.

14 Claims, 5 Drawing Sheets

USER INFORMATION WIDGETS AND METHODS FOR UPDATING AND RETRIEVING USER INFORMATION

BACKGROUND

The present application relates generally to communications networks, and, more particularly, to web applications available over communications networks.

Communications networks are widely used for nationwide and worldwide communication of voice, multimedia and/or data. As used herein, the term "communications networks" includes public communications networks, such as the Public Switched Telephone Network (PSTN), terrestrial and/or satellite cellular networks, private networks and/or the Internet.

The Internet is a decentralized network of computers that can communicate with one another via Internet Protocol (IP). The Internet includes the World Wide Web (web) service facility, which is a client/server-based facility that includes a large number of servers (computers connected to the Internet) on which web pages or files reside, as well as clients (web browsers), which interface users with the web pages. The topology of the web can be described as a network of networks, with providers of network services called Network Service Providers, or NSPs. Servers that provide application-layer services may be referred to as Application Service Providers (ASPs). Sometimes a single service provider provides both functions.

It is common to use passwords to allow users to access various web-based services and applications. However, because the use of passwords is so pervasive, it is not unusual for a user to have a large number of different passwords for different web-based applications. It may be difficult for users to remember large numbers of passwords, particularly complex passwords that satisfy strong security measures. Moreover, users may be required to generate new passwords periodically, thereby increasing the difficulty of remembering and managing multiple passwords. Moreover, web applications may require user input of various personal information (e.g., social security numbers, addresses, phone numbers, birth dates, etc.). However, there is increasing concern among users regarding privacy and the dissemination of personal information online, particularly to web applications. Improved ways of guarding personal information and managing passwords and other user authentication information are desired.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to exemplary embodiments, methods and apparatus for updating and retrieving user information via widgets are provided. A method of providing user information (e.g., user preference information and/or personal identifying information) to web applications includes embedding a widget in a web page associated with a web application served to a user's client from a web application server. The widget is a software component that is configured to retrieve user information from a user information web server repository in response to a request by a web application for user information. The widget is also configured to request user permission to retrieve the user information from the repository and to request user verification of retrieved information prior to providing the retrieved information to the requesting web application. In addition, the user information widget is configured to authenticate a user prior to retrieving user information from the repository. For example, the user information widget may authenticate a user by requesting credentials (e.g., user identification and/or password) from the user and verifying that the received credentials are valid for the user.

A user information web server, according to some embodiments, includes a repository of user information, and a user information web application that is configured to allow users to query and update user information stored in the repository. The user information web application is also configured to embed a user information widget in third party web applications requested by users via clients. The user information widget is configured to retrieve user information from the repository and provide the retrieved user information to a third party web application requesting the user information. The user information widget may also be configured to perform various authentication and verification functions.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which form a part of the specification, illustrate some exemplary embodiments. The drawings and description together serve to fully explain the exemplary embodiments.

DETAILED DESCRIPTION

While various modifications and alternative forms of the embodiments described herein may be made, specific embodiments are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification are taken to specify the presence of stated features, steps, operations, elements, and/or components, but do not preclude the presence or addition of one or more other features, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another.

Exemplary embodiments are described below with reference to block diagrams and/or flowchart illustrations of methods, apparatus (systems and/or devices) and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, exemplary embodiments may be implemented in hardware and/or in software (including firmware, resident software, micro-code, etc.). Furthermore, exemplary embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Python, Java, AJAX (Asynchronous JavaScript), C, and/or C++, for development convenience. In addition, computer program code for carrying out operations of exemplary embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a programmed digital signal processor or microcontroller.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

According to embodiments, a single, secure source for authenticating users and providing user information to web applications on a network is provided. As such, user management may be simplified for web application developers. In addition, the burden on users of maintaining credentials and other personal information for multiple web applications can be reduced.

Figure 1:
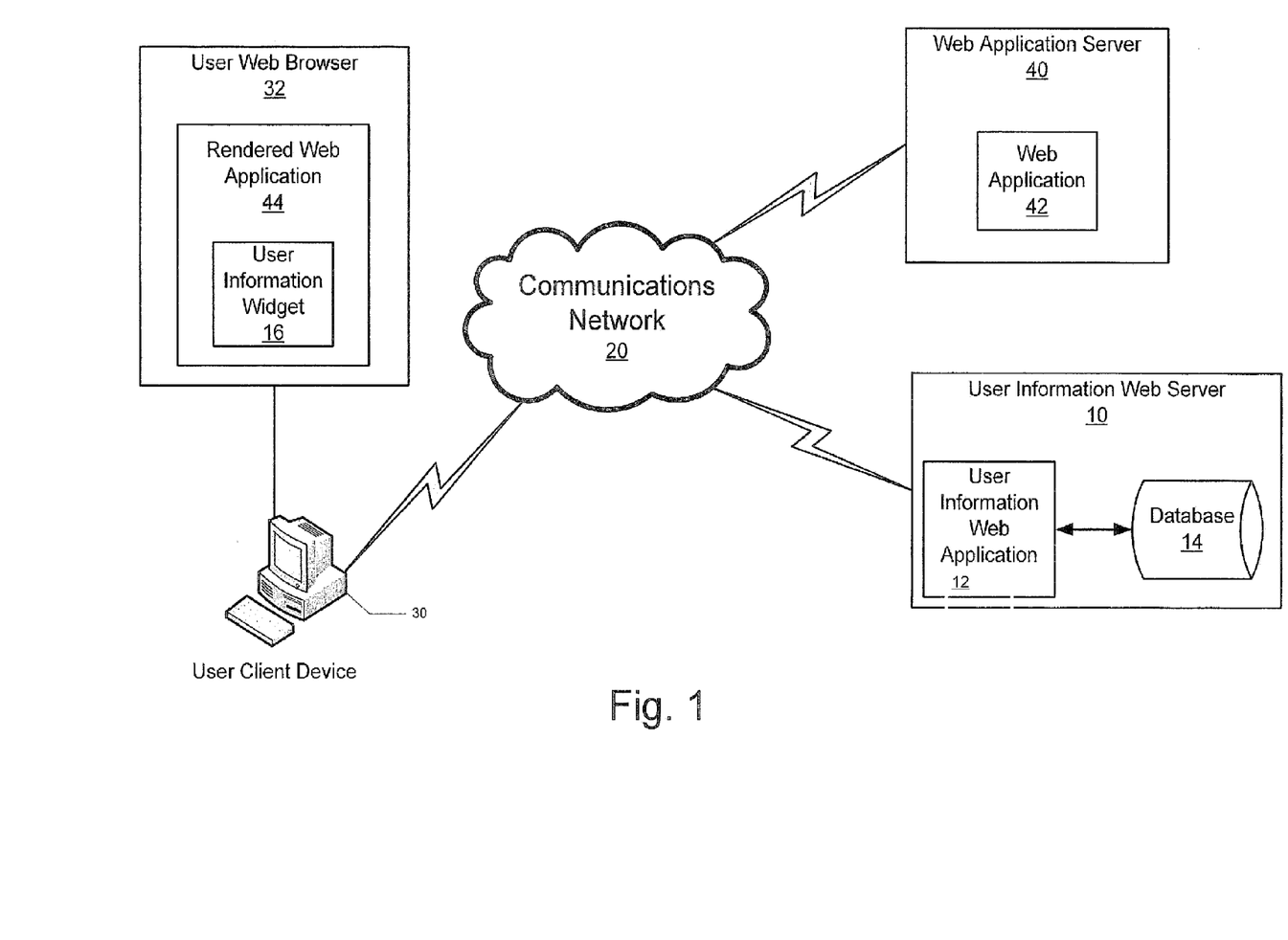
FIG. 1 is a block diagram that illustrates a user information web server connected to a communications network, such as the Internet, according to some embodiments.

Referring to FIG. 1, a user information web server 10, according to some embodiments, is illustrated. The web server 10 is connected to a network 20, such as the Internet, and includes a user information web application 12 and a repository or database 14 that stores user information. The user information web application 12 allows users to query and update user information stored in the repository 14 via clients (e.g., web browsers, etc.) running on devices 30 connected to the network 20. The user information web application 12 is also configured to embed a user information widget 16 in third party web applications requested by users via clients connected to the network 20. For example, in FIG. 1, a user has requested the services of a web application 42 from a third party web application server 40. A client 32, such as a web browser, executing on the user's client device 30 renders the requested web application 42 served by the third party web application server 40, for example as a web page 44, as would be understood by those skilled in the art. Embedded within the rendered web page 44 is a user information widget 16 from the user information web server 10.

The user information widget 16, in response to a request for user information from the web application 42, is configured to retrieve user information from the user information web server repository 14 and provide the retrieved user information to the web application 42. Authentication and verification procedures may be followed, as described below. The user information widget 16 is advantageous because it retrieves various user information that the user has previously provided, thereby allowing the user not to have to remember or provide such information for each web application.

User information stored within and retrievable from the repository 14 may be of various types including, but not limited to, user preference information, and personal identifying information. User preference information is application-specific information that affects how services of a web application are provided to a user. Exemplary user preference information includes, but is not limited to, web page layout, color schemes, user activity such as purchase history, etc. Personally identifying information is information that may be used to identify unique properties of the user. Exemplary personal identifying information includes, but is not limited to, credit card information, social security information, addresses, telephone numbers, bank account information, birth dates, etc.

The user information widget 16 is also configured to perform various verification and authentication functions. For example, the user information widget 16 is configured to request user permission to retrieve user information from the repository 14 in response to a request by a web application 42 for user information. The user information widget 16 also is configured to request user verification of retrieved information prior to providing the retrieved information requested to the requesting web application 42. For example, if the widget 16 retrieves a credit card number from the repository 14, the widget 16 requests the user to verify the accuracy of the credit card number before providing the credit card number to the web application. In addition, the user information widget 16 is configured to authenticate a user prior to retrieving user information from the repository 14. The user information widget 16 authenticates a user by requesting credentials (e.g., user identification and/or password) from the user and verifying that the received credentials are valid for the user.

Figure 2:
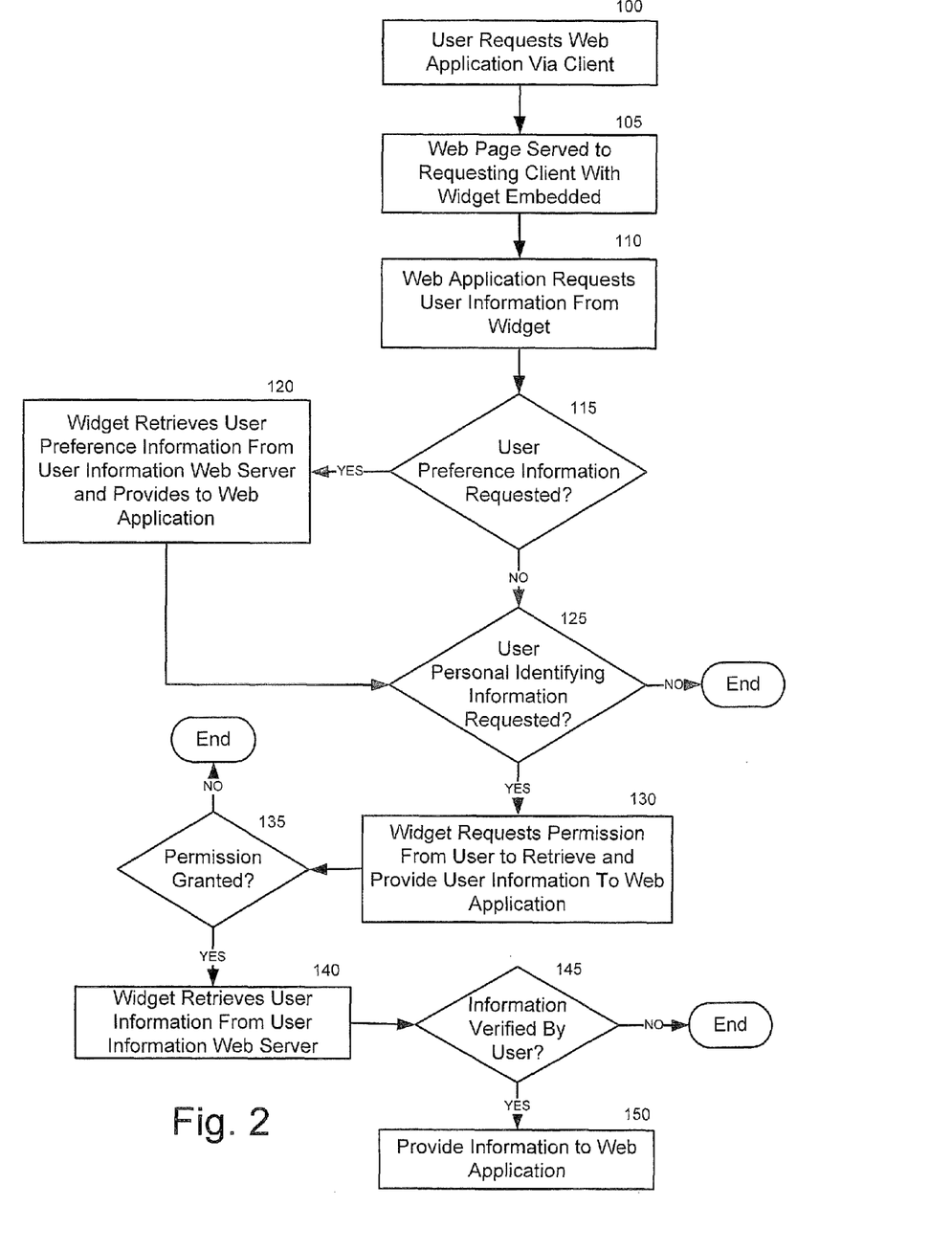
FIG. 2 is a flowchart that illustrates exemplary operations for providing user information to web applications via widgets, according to some embodiments.

FIG. 2 is a flowchart of operations for providing user information to web applications via a user information widget 16, according to some embodiments. A user requests the services of a web application 42 via a client 32 (Block 100). A web page 44 associated with the web application 42 is served to the requesting client 32 via a web application server 40 (Block 105). A user information widget 16 is embedded within the rendered web page 44 via the user information web server 10. In response to a request from the web application 42 for user information (Block 110), a determination is made whether the requested user information is user preference information (Block 115). If the requested user information is user preference information, the user information widget 16 retrieves the requested user preference information from the user information web server repository 14 and provides the retrieved information to the web application 42 (Block 120). Although not illustrated, an additional step of allowing the user to verify the accuracy of the user preference information prior to providing this information to the web application may be performed by the widget 16.

If the requested user information is not user preference information, a determination is made whether the requested user information is personal identifying information (Block 125). If the requested information is not personal identifying information, operations terminate in the illustrated embodiment. If the requested information is personal identifying information, the user information widget 16 requests permission from the user to retrieve the requested user information from the user information web server repository 14. If permission is granted by the user to retrieve the requested user information (Block 135), the user information widget 16 retrieves the requested user information from the user information web server repository 14 (Block 140), otherwise operations terminate.

Upon retrieving the requested user information, the user information widget 16 requests the user to verify that the retrieved information (Block 145). If the retrieved information is verified by the user, the retrieved information is provided to the web application 42 (Block 150). If the retrieved information is not verified by the user, operations terminate and the information is not provided to the web application 42.

Figure 3:
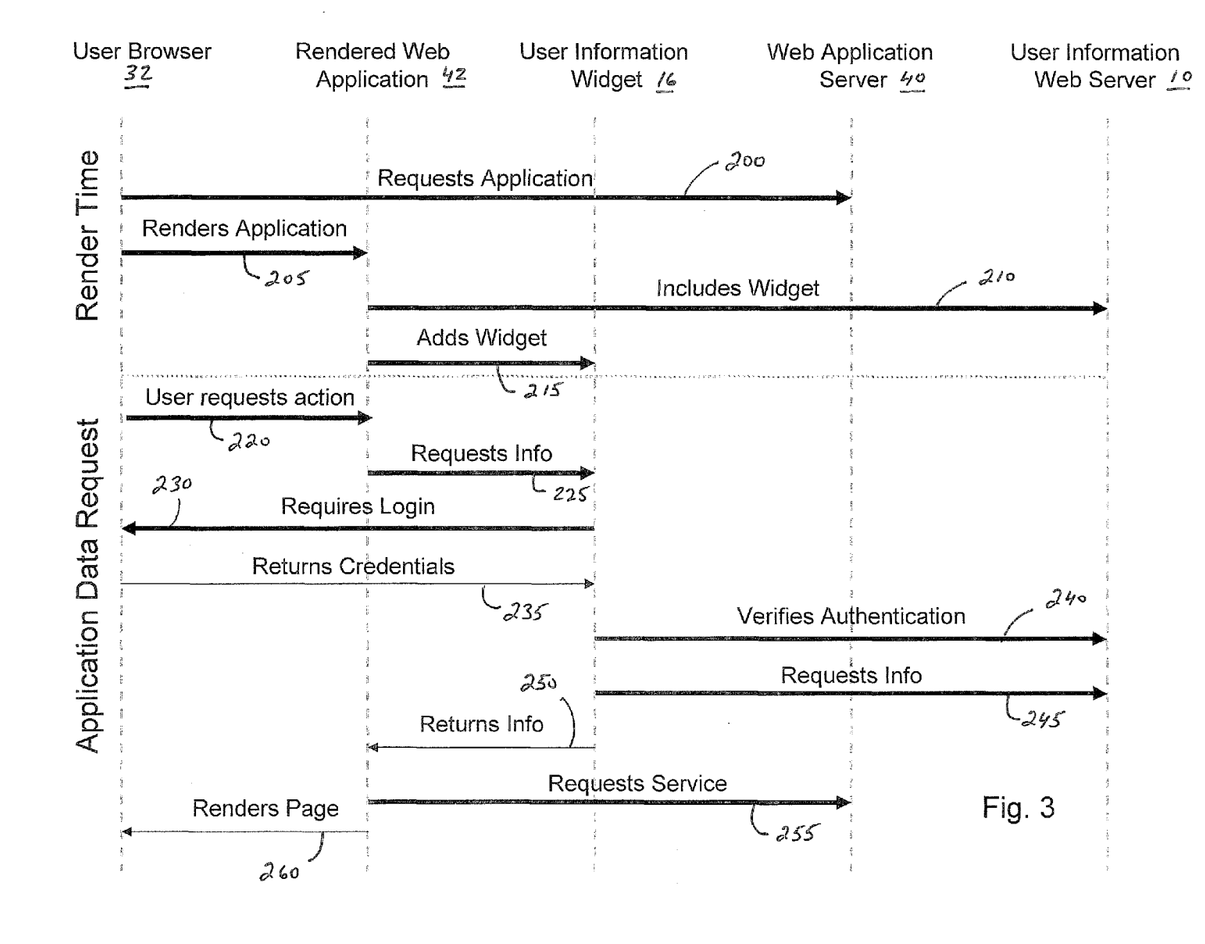
FIG. 3 is a sequence diagram that illustrates interactions between a client, rendered web application, a user information widget, a web application server, and a user information web server, according to some embodiments.

FIG. 3 is a sequence diagram that illustrates interactions between a client (web browser) 32, a rendered web application 42, a user information widget 16, a web application server 40, and a user information web server 10, according to some embodiments. The upper portion of the sequence diagram of FIG. 3 illustrates interactions during "render time" or the time when a user requests the services of a web application. The lower portion of the sequence diagram of FIG. 3 illustrates interactions during an application data request (e.g., a user information request by a web application).

Referring initially to the upper portion of the sequence diagram of FIG. 3, a user, via a client 32, sends a web application request 200 to a web application server 40. The client 32 renders a web page(s) representative of the requested web application 42, represented by 205. The web application retrieves a user information widget 16 from the user information web server 10, represented by 210, and adds the widget 16 to the rendered web page(s) of the web application 42, represented by 215.

Referring to the lower portion of the sequence diagram of FIG. 3, a user requests some action of the rendered web application 42 that requires user information, represented by 220. The web application 42 requests user information, represented by 225. The embedded user information widget 16 requires the user to login, represented by 230. In response, the user inputs his/her credentials (e.g., user identification, password, etc.), represented by 235. The user information widget 16 verifies the authenticity of the credentials provided by the user with the user information web server 10, represented by 240, and obtains the requested user information from the user information web server repository 14, represented by 245. The user information widget 16 returns the requested user information to the rendered web page of the web application, represented by 250. The web application 42 requests service from the web application server 40, represented by 255. This service request corresponds to the user requested action, represented by 220. The rendered web application then renders a web page to the client that corresponds with the user requested action, represented by 260. Although not illustrated, the widget 16 may perform various user verification steps as discussed above.

Figure 4:
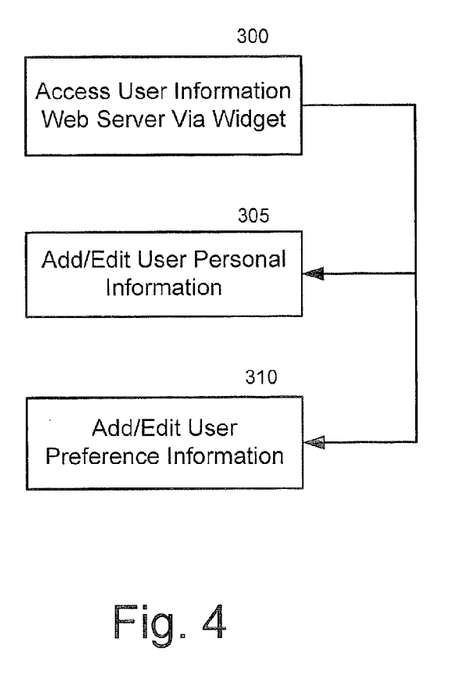
FIG. 4 is a flowchart that illustrates exemplary operations for accessing user information at a user information web server repository, according to some embodiments.

Referring to FIG. 4, the user information widget 16 can serve additional functions. For example, a user may utilize the user information widget 16 to access existing user information at the user information web server and/or to add user information (Block 300). Via the widget 16, a user can add and/or edit personal identifying information (Block 305) and can add and/or edit user preference information (Block 310).

Figure 5:
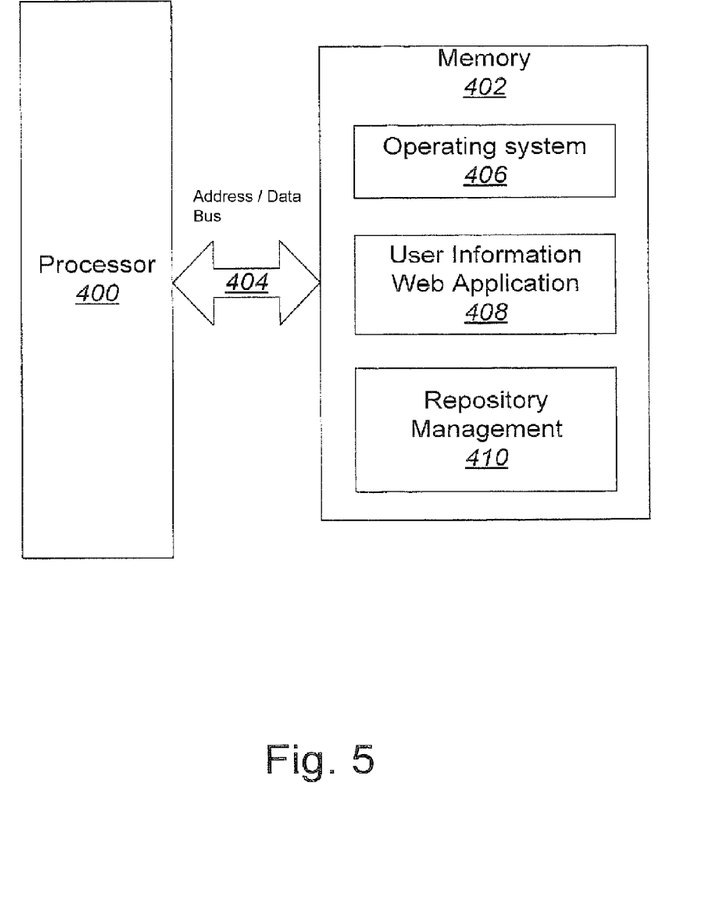
FIG. 5 is a block diagram that illustrates details of an exemplary processor and memory that may be used by a user information web server, according to some embodiments.

FIG. 5 illustrates an exemplary processor 400 and memory 402 that may be used by a user information web server 10, according to some embodiments. The processor 400 communicates with the memory 402 via an address/data bus 404. The processor 400 may be, for example, a commercially available or custom microprocessor. The memory 402 is representative of the overall hierarchy of memory devices containing the software and data used to implement a user information web server as described herein, in accordance with some embodiments. The memory 402 may include, but is not limited to, the following types of devices: cache, ROM, PROM, EPROM, EEPROM, flash, SRAM, and DRAM.

As shown in FIG. 5, the memory 402 may hold various categories of software and data: an operating system 406, a user information web application module 408, and a user information repository management module 410. The operating system 406 controls operations of the user information web server 10. In particular, the operating system 406 may manage the resources of the user information web server 10 and may coordinate execution of various programs (e.g., the user information web application module 408, and the repository management module 210, etc.) by the processor 400.

The user information web application module 408 comprises logic for embedding a user information widget 16 within a rendered web application on a client 32, and for interacting with the widget 16 as the widget retrieves user information from the user information web server repository 14, as described above. The repository management module 410 comprises logic for allowing a user to access and update user information in the user information web server repository 14, as described above.

Many variations and modifications can be made to the preferred embodiments without substantially departing from the principles of the present invention. All such variations and modifications are intended to be included herein within the scope of the present invention, as set forth in the following claims.

That which is claimed:

1. A method of providing user information to a web application server, the method comprising:
receiving, by a client, a web page from a web application server, wherein the web page comprises an embedded user information widget, wherein the client is associated with a user, wherein the embedded user information widget is operable when executed to retrieve personal identifying information about the user from a user information web server, wherein the personal identifying information about the user includes one or more of credit card information about a credit card owned by the user, a social security number of the user, an address of the user, a telephone number for the user, a bank account number for a bank account owned by the user, and a birth date of the user, and wherein the embedded user information widget is further operable when executed to retrieve, from the user information web server, user preference information that describes a user's preference for a web page layout and color scheme of the web page when rendered on the client;
receiving, by the embedded user information widget on the client and from the web application server, a request for personal identifying information about the user;
retrieving, by the embedded user information widget on the client, the personal identifying information about the user and the user preference information from the user information web server;
transmitting, from the embedded user information widget on the client to the web application server, the personal identifying information about the user and the user preference information that the embedded user information widget received from the user information web server;
populating, by the web application server, the web page with the personal identifying information about the user; and
rendering, on the client, the web page with the personal identifying information about the user using the user's preference for the web page layout and color scheme found in the embedded user information widget.

2. The method of claim 1, further comprising authenticating the user to the embedded user information widget prior to retrieving the personal identifying information about the user.

3. The method of claim 2, wherein authenticating the user to the embedded user information widget comprises receiving a user identification and password from the user and verifying that the user identification and password received are valid for the user.

4. The method of claim 1, further comprising:
providing, by the embedded user information widget on the client, the user with access to the user information web server;
receiving, by the embedded user information widget on the client, changes to the personal identifying information about the user that are input by the user; and
transmitting, from the embedded user information widget on the client to the user information web server, the changes to the personal identifying information about the user that are input by the user.

5. The method of claim 1, wherein the personal identifying information and the user's preference for the web page layout and the color scheme of the web page are not stored on the client, wherein the personal identifying information and the user's preference for the web page layout and the color scheme of the web page are provided to a web application on the web application server by the client executing the user information widget on the client, wherein executing the user information widget on the client causes the user information web server to provide the personal identifying information and the user's preference for the web page layout and the color scheme of the web page to the web application on the web application server.

6. A computer program product comprising one or more non-transitory computer readable storage mediums, and program instructions stored on at least one of the one or more non-transitory computer readable storage mediums, the stored program instructions comprising:

program instructions to receive, by a client, a web page from a web application server, wherein the web page comprises an embedded user information widget, wherein the client is associated with a user, wherein the embedded user information widget is operable when executed to retrieve personal identifying information about the user from a user information web server, and wherein the personal identifying information about the user includes one or more of credit card information about a credit card owned by the user, a social security number of the user, an address of the user, a telephone number for the user, a bank account number for a bank account owned by the user, and a birth date of the user, and wherein the embedded user information widget is further operable when executed to retrieve, from the user information web server, user preference information that describes a user's preference for a web page layout and color scheme of the web page when rendered on the client;

program instructions to receive, by the client and from the web application server, a request for personal identifying information about the user;

program instructions to retrieve, by the embedded user information widget on the client, the personal identifying information about the user and the user preference information from the user information web server;

program instructions to transmit, from the client to the web application server, the personal identifying information about the user and the user preference information that the embedded user information widget received from the user information web server;

program instructions to populate, by the web application server, the web page with the personal identifying information about the user; and program instructions to render, on the client, the web page with the personal identifying information about the user using the user's preference for the web page layout and color scheme found in the embedded user information widget.

7. The computer program product of claim 6, further comprising:
program instructions to authenticate the user to the embedded user information widget prior to retrieving the personal identifying information about the user.

8. The computer program product of claim 7, wherein authenticating the user to the embedded user information widget comprises receiving a user identification and password from the user and verifying that the user identification and password received are valid for the user.

9. The computer program product of claim 6, further comprising:
program instructions to provide, by the embedded user information widget on the client, the user with access to the user information web server;
program instructions to receive, by embedded user information widget on the client, changes to the personal identifying information about the user that are input by the user; and
program instructions to transmit, from the embedded user information widget on the client to the user information web server, the changes to the personal identifying information about the user that are input by the user.

10. The computer program product of claim 6, further comprising:

program instructions to request, by the client, user permission to retrieve the personal identifying information about the user via the embedded user information widget.

11. A computer system comprising one or more processors, one or more computer readable memories, and one or more computer readable storage mediums, and program instructions stored on at least one of the one or more computer readable storage mediums for execution by at least one of the one or more processors via at least one of the one or more computer readable memories, the program instructions comprising:

program instructions to receive, by a client, a web page from a web application server, wherein the web page comprises an embedded user information widget, wherein the client is associated with a user, wherein the embedded user information widget is operable when executed to retrieve personal identifying information about the user from a user information web server, and wherein the personal identifying information about the user includes one or more of credit card information about a credit card owned by the user, a social security number of the user, an address of the user, a telephone number for the user, a bank account number for a bank account owned by the user, and a birth date of the user, and wherein the embedded user information widget is further operable when executed to retrieve, from the user information web server, user preference information that describes a user's preference for a web page layout and color scheme of the web page when rendered on the client;

program instructions to receive, by the client and from the web application server, a request for personal identifying information about the user;

program instructions to retrieve, by the embedded user information widget on the client, the personal identifying information about the user and the user preference information from the user information web server;

program instructions to transmit, from the client to the web application server, the personal identifying information about the user and the user preference information that the embedded user information widget received from the user information web server;

program instructions to populate, by the web application server, the web page with the personal identifying information about the user; and program instructions to render, on the client, the web page with the personal identifying information about the user using the user's preference for the web page layout and color scheme found in the embedded user information widget.

12. The computer system of claim 11, further comprising:
program instructions to authenticate the user to the embedded user information widget prior to retrieving the personal identifying information about the user.

13. The computer system of claim 12, wherein authenticating the user to the embedded user information widget comprises receiving a user identification and password from the user and verifying that the user identification and password received are valid for the user.

14. The computer system of claim 11, further comprising:
program instructions to provide, by the embedded user information widget on the client, the user with access to the user information web server;

program instructions to receive, by the embedded user information widget on the client, changes to the personal identifying information about the user that are input by the user; and program instructions to transmit, from the embedded user information widget on the client to the user information web server, the changes to the personal identifying information about the user that are input by the user.

* * * * *